(12) United States Patent
Reif (10) Patent No.: US 11,233,319 B2
(45) Date of Patent: Jan. 25, 2022

(54) RECREATIONAL VEHICLE SATELLITE DISH SUPPORT

(71) Applicants: Dennis Reif, Wichita, KS (US); Nancy Reif, Wichita, KS (US)

(72) Inventor: Dennis Reif, Wichita, KS (US)

(73) Assignees: Dennis Reif, Wichita, KS (US); Nancy Reif, Wichita, KS (US)

( * ) Notice: Subject to any disclaimer, the term of this patent is extended or adjusted under 35 U.S.C. 154(b) by 0 days.

(21) Appl. No.: 16/695,938

(22) Filed: Nov. 26, 2019

(65) Prior Publication Data

US 2020/0411973 A1     Dec. 31, 2020

(51) Int. Cl.
*H01Q 1/32* (2006.01)
*H01Q 1/12* (2006.01)
*B60R 11/02* (2006.01)

(52) U.S. Cl.
CPC ........... *H01Q 1/3283* (2013.01); *B60R 11/02* (2013.01); *H01Q 1/1235* (2013.01)

(58) Field of Classification Search
CPC ........ H01Q 1/084; H01Q 1/1228; H01Q 1/12; H01Q 1/1235; H01Q 1/1242; H01Q 1/125; H01Q 1/22; H01Q 1/32; H01Q 1/325; H01Q 1/3275; H01Q 1/3291; H01Q 1/088; H01Q 1/1264; B60R 11/02; B60R 2011/004; B60R 2011/0071; B60R 2011/008; B60R 2011/0082; B60R 2011/0084; B60R 3/005; B60R 9/06; B60Q 1/2657
See application file for complete search history.

(56) References Cited

U.S. PATENT DOCUMENTS

| 3,587,104 | A |   | 6/1971  | Budrow et al. |
| 4,249,182 | A | * | 2/1981  | Rupley ............... H01Q 1/1235 248/539 |
| 4,538,155 | A |   | 8/1985  | Stewart |
| 4,663,632 | A |   | 5/1987  | Budrow et al. |
| 4,794,399 | A |   | 12/1988 | Sensibaugh |
| 5,337,062 | A |   | 8/1994  | Sherwood et al. |
| 5,554,998 | A |   | 9/1996  | Sherwood et al. |

(Continued)

FOREIGN PATENT DOCUMENTS

| AU | 704586 | 3/1999 |
| AU | 736873 | 12/1999 |

OTHER PUBLICATIONS

King Ladder Bracket https://kingconnect.com/product/ladder-mount/#prettyPhoto.

(Continued)

*Primary Examiner* — Dimary S Lopez Cruz
*Assistant Examiner* — Yonchan J Kim
(74) *Attorney, Agent, or Firm* — Kenneth H. Jack; Davis & Jack, L.L.C.

(57) ABSTRACT

A recreational vehicle satellite dish support incorporating a telescopingly segmented first arm having a proximal end, a distal end, and a lower surface; a fulcrum plate attached at the lower surface of the first arm, the fulcrum plate being positioned between the first arm's proximal and distal ends; an upwardly facing pivot stop fixedly attached to the first arm's proximal end; and a satellite dish mount fixedly attached to the first arm's distal end, the satellite dish mount including a telescopingly segmented second arm having upper and lower ends.

14 Claims, 9 Drawing Sheets

(56) References Cited

U.S. PATENT DOCUMENTS

| | | | |
|---|---|---|---|
| 5,886,673 | A | 3/1999 | Thomas |
| 5,929,817 | A | 7/1999 | Clark |
| 5,929,818 | A | 7/1999 | Snyder |
| 6,175,339 | B1 | 1/2001 | Macon |
| 6,682,029 | B1 | 1/2004 | Dierkes |
| 6,714,129 | B1 | 3/2004 | Luna, Sr. |
| 7,557,764 | B2 | 7/2009 | Krajicek |
| 8,657,250 | B2 | 2/2014 | Venghaus |
| 8,816,923 | B2 | 8/2014 | King et al. |
| 9,225,061 | B2 | 12/2015 | Shuster et al. |
| 9,543,634 | B1* | 1/2017 | Bailey ............... H01Q 1/10 |
| 9,960,481 | B2* | 5/2018 | Roberts ............ H01Q 1/1242 |
| 10,074,896 | B1 | 9/2018 | Haiflich et al. |
| 2004/0169114 | A1 | 9/2004 | Dierkes |
| 2007/0007402 | A1 | 1/2007 | Dierkes |
| 2007/0247378 | A1* | 10/2007 | Masterson ......... H01Q 1/3208 343/713 |
| 2008/0170272 | A1 | 7/2008 | Bleazard |
| 2009/0262033 | A1* | 10/2009 | King ............... H01Q 19/12 343/713 |
| 2010/0295751 | A1 | 11/2010 | Sheers |
| 2011/0006958 | A1 | 1/2011 | Frederick |
| 2014/0239025 | A1* | 8/2014 | Scott ............... B60P 3/40 224/405 |

OTHER PUBLICATIONS

RV Ladder Antenna Mounting System The DX Store—866-899-DXIS Monday, Dec. 24, 2018, 10:15 AM www.dxstore.com/rv_ladder_antenna_mount.html.

RV Ladder Mount Antenna Mast. Discussion in 'RV Operating and Camping' started by AC0GV, May 3, 2016. https://forums.qrz.com/index.php?threads/rv-ladder-mount-antenna-mast.522026/.

Rung Rack Paintman Industries https://paintmanindustries.com/product/rung-rack/.

* cited by examiner

RECREATIONAL VEHICLE SATELLITE DISH SUPPORT

FIELD OF THE INVENTION

This invention relates to apparatus and assemblies which are specially adapted for attaching satellite dishes to vehicles such as motorized recreational vehicles and recreational travel trailers.

BACKGROUND OF THE INVENTION

Commonly known and commonly configured bracket assemblies for mounting satellite dishes to recreational vehicles are typically mechanically complex and cumbersome. Also, such known mounting assemblies often cause and present difficulties in installation and de-installation of a satellite dish onto and from a recreational vehicle.

The instant inventive recreational vehicle satellite dish support solves or ameliorates problems, defects, and deficiencies discussed above by providing a specially configured support arm which includes adaptations for quick and easy attachments to, and detachments from, a recreational vehicle's rear step ladder.

BRIEF SUMMARY OF THE INVENTION

A first structural component of the instant inventive recreational vehicle satellite dish support comprises at least a first arm having a proximal end, a distal end, and having a lower surface. Upon assembly and use, the at least first arm component has a proximal end which is removably attached to a rear ladder of a recreational vehicle, and has a cantilevering distal end upon which a small satellite dish is mounted and supported.

In a preferred embodiment, the first arm component is segmented, including a proximal segment and a distal segment. Such segments are preferably telescopically attached or interconnected for arm lengthening extensions, and alternatively for arm shortening retractions. In a preferred embodiment, the first arm's segments together constitute a quill and stem combination.

A further structural component of the instant inventive satellite dish support comprises a fulcrum point which preferably resides at a lower surface or side of the first arm, such point being positioned between such arm's proximal and distal ends. In a suitable embodiment, the fulcrum point resides at a lower surface of a longitudinally extending stabilizer plate which is attached beneath the first arm.

A further structural component of the instant inventive recreational vehicle satellite dish support comprises an upwardly facing pivot stop which is fixedly attached and positioned at the first arm's proximal end. In a preferred embodiment, the upwardly facing pivot stop comprises an upper surface of a lower arm of a "C" bracket which is attached at the first arm's proximal end.

A further component of the instant invention comprises a satellite dish mount which may incorporate a circular dish support plate. The satellite dish mount component is preferably fixedly attached to the distal end of the first arm.

In use of the instant inventive satellite dish support, an operator may initially attach a small dome covered satellite dish to an upper surface of the satellite dish mount. Thereafter, the operator may proximally extend the proximal end of the first arm between the rearward wall of a recreational vehicle and the vehicle's rear roof access ladder. In a preferred mode of installation and use of the satellite dish support, such operator actuated arm extension may situate the upwardly facing pivot stop component immediately below a proximal-most post among a laterally adjacent pair of the ladder's support posts. The operator may then downwardly position the fulcrum point immediately above such support post pair's distal-most post.

Thereafter, the operator may release the first arm and its attached satellite dish. Upon release, the weight of the satellite dish advantageously biases the distal end of the first arm downwardly, driving the fulcrum point downwardly against such distal-most ladder support post. Such distal levering effect simultaneously counter-levers the upwardly facing pivot stop upwardly against an undersurface of the proximal-most ladder post. Such levering actions imposed by the weight of the satellite dish upon the first arm advantageously securely mount the first arm to the ladder, while distally cantilevering the satellite dish from one of the side walls of the recreational vehicle. The instant invention allows an operator to quickly and easily install and de-install the satellite dish upon a recreational vehicle via simple positionings of the arm's two contact points in relation to the ladder's laterally paired support posts.

Accordingly, object of the instant invention include the provision of a recreational vehicle satellite dish support which incorporates structures described above, and which arranges those structures in relation to each other in manners described above for the achievement and performance of beneficial functions described above.

Other and further objects, benefits, and advantages of the instant invention will become known to those skilled in the art upon review of the Detailed Description which follows, and upon review of the appended drawings.

DETAILED DESCRIPTION OF PREFERRED EMBODIMENTS

Referring now to the drawings, and in particular to Drawing FIGS. 1-6, the instant inventive recreational vehicle satellite dish support comprises at least a first arm which preferably includes a proximal segment 2 and a distal segment 30. The first arm's proximal segment 2 is preferably tubular, having a hollow bore 8. The distal segment 30 of the arm is similarly preferably tubular having an outside diameter closely fitted for insertion into and nesting or sliding receipt within the hollow bore 8, the proximal segment 2 and the distal segment 30 constituting a telescoping quill and stem combination.

The preferred close nesting fit of the distal segment 30 within the bore 8 of the proximal segment 2 advantageously allows telescoping motion of the distal segment 30 with respect to the proximal segment 2 for alternatively distally extending and proximally retracting the support's first arm. A set screw collar 4 is preferably welded to the distal end of the side wall of the proximal segment 2, such collar 4 having an internally helically threaded bore 6 which communicates with bore 8. A set screw and turn knob combination 28 may threadedly engage within bore 6, advantageously allowing the inner end of such set screw to alternatively clamp against and release the distal segment 30.

A further structural component of the instant inventive satellite dish support comprises a fulcrum point which is positioned at a lower or underlying surface of the first arm, such point being positioned between the first arm's proximal and distal ends. In a suitable embodiment, the fulcrum point comprises a contact line extending longitudinally across a lower surface 11 of a longitudinally oblongated stabilizer plate 10. Plate 10 is suitably fixedly attached to proximal segment 2 by means of welds 14, and segments 2 and 30 are suitably composed of aluminum or steel. Suitably, as indicated below in relation to the FIG. 11 alternative structure, the stabilizer plate component may reside at the proximal end of the first arm.

A further structural component of the instant inventive satellite dish support comprises an upwardly facing pivot stop which is fixedly attached to or positioned at the first arm's proximal end 3. In a suitable preferred embodiment, the upwardly facing pivot stop component comprises an upper surface 20 of a lower arm 18 of a distally opening "C" bracket component 16. Such surface 20 is referred to below as an 'upwardly facing pivot stop 20' and as an 'upwardly facing pivot stopping surface 20.' Such "C" bracket 16 is suitably attached to the proximal end 3 of segment 2 by means of an extension bracket 19 which is attached by a weld 21. An alternatively configured "C" bracket appears in FIG. 11.

A further structural component of the instant inventive satellite dish support comprises a satellite dish mount, which is referred to generally by Reference Arrow 33, such mount being fixedly attached to the distal end of the first arm. In a suitable embodiment, the satellite dish mount comprises a second segmented arm or quill and stem combination 46,32, such second arm having a set screw collar 34 and helically threaded bore 36 for receipt of a second turn knob actuated set screw 40. The second arm's upper segment 46 may be capable of adjustably telescoping, and suitably has circular support plate 44 attached by a weld 48 to its upper end. The lower end of segment 46 may be slidably receivable within the upper bore opening 38 of the lower segment 32. Where it is provided, the second vertically oriented arm 46,32 is preferably attached in a "T" joint configuration by a weld 31 at the extreme distal end of the distal segment 30.

The satellite dish mount structures 44, 46, 40, and 32, depicted in FIGS. 1-6 are intended as being representative of other commonly known fastening assemblies which may suitably attach a satellite dish such as dome covered dish 50 to the distal end of a cantilevering arm such as arm 2,30.

Figure 1:
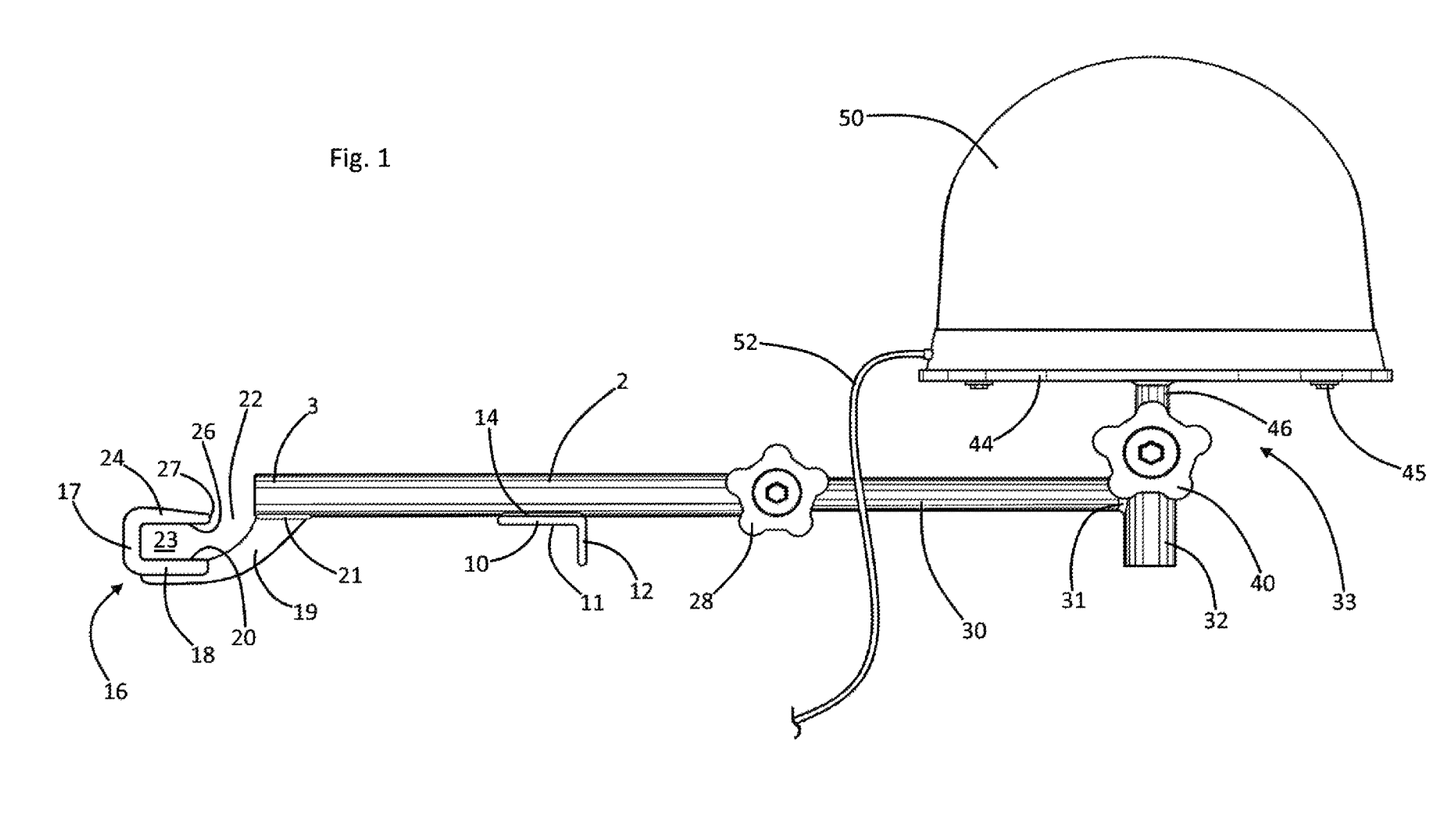
FIG. 1 is a side view of a suitable embodiment of the instant inventive recreational vehicle satellite dish support, such view further showing an attached satellite dish.
Figure 2:
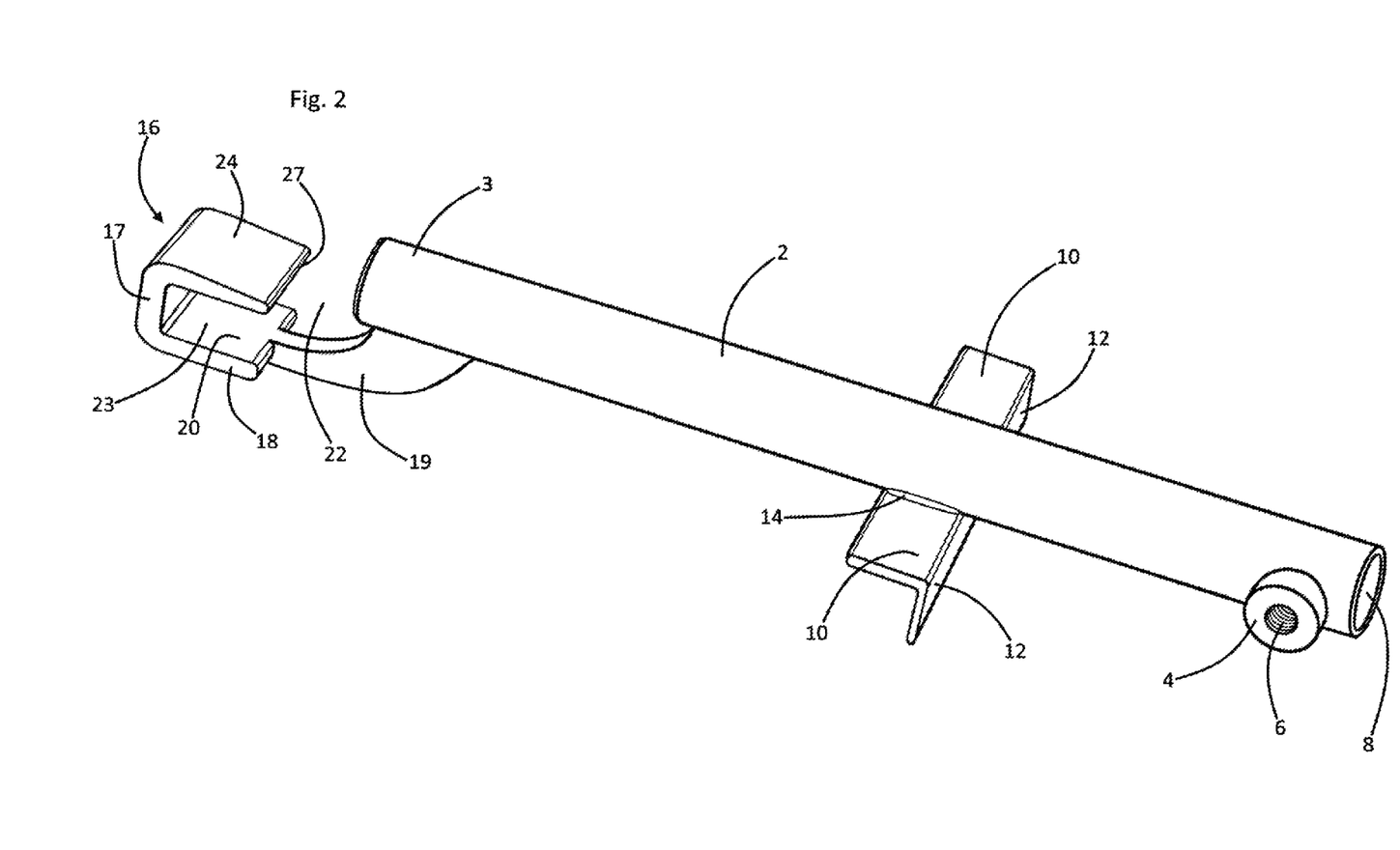
FIG. 2 is a perspective view of a disassembled proximal component of the assembly of FIG. 1.
Figure 3:
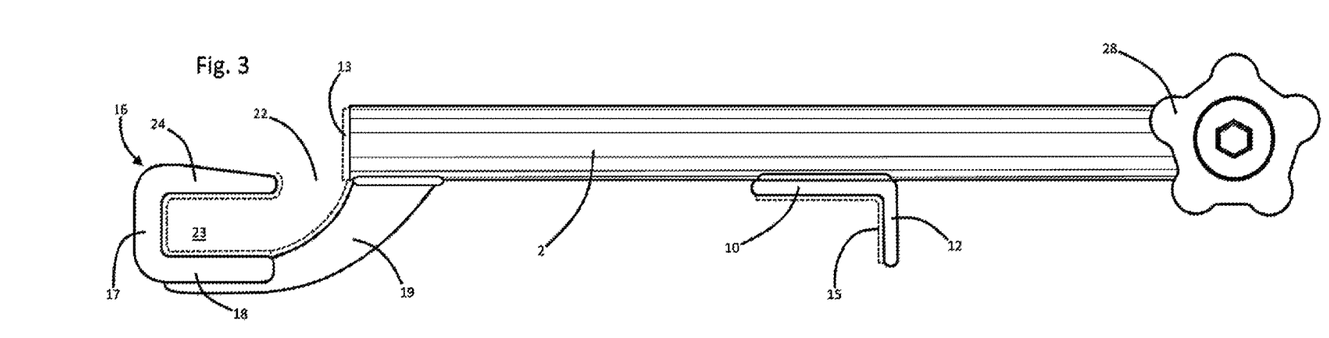
FIG. 3 redepicts the assembly of FIG. 1, the view of FIG. 3 showing distal components removed.
Figures 4, 5:
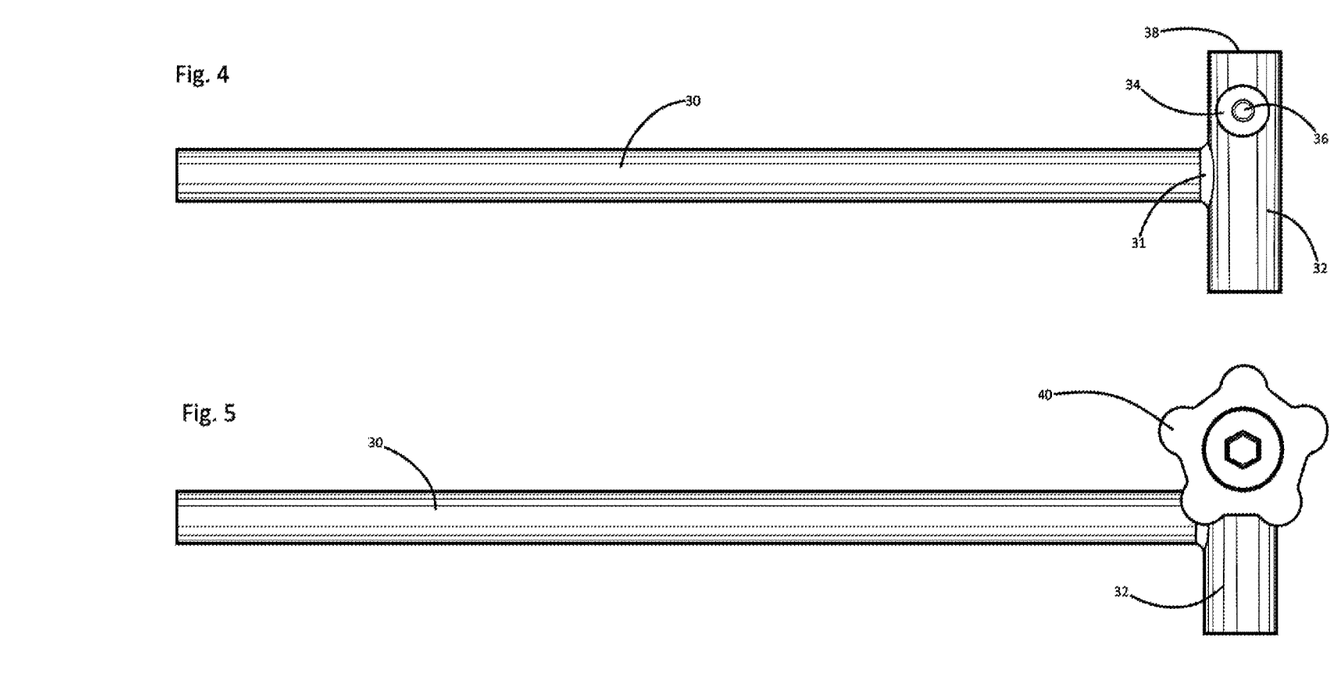
FIG. 4 presents a side view of a disassembled distal component of the assembly of FIG. 1.
FIG. 5 redepicts the structure of FIG. 4, the view of FIG. 5 further showing an attached first set screw and turn knob.
Figure 6:
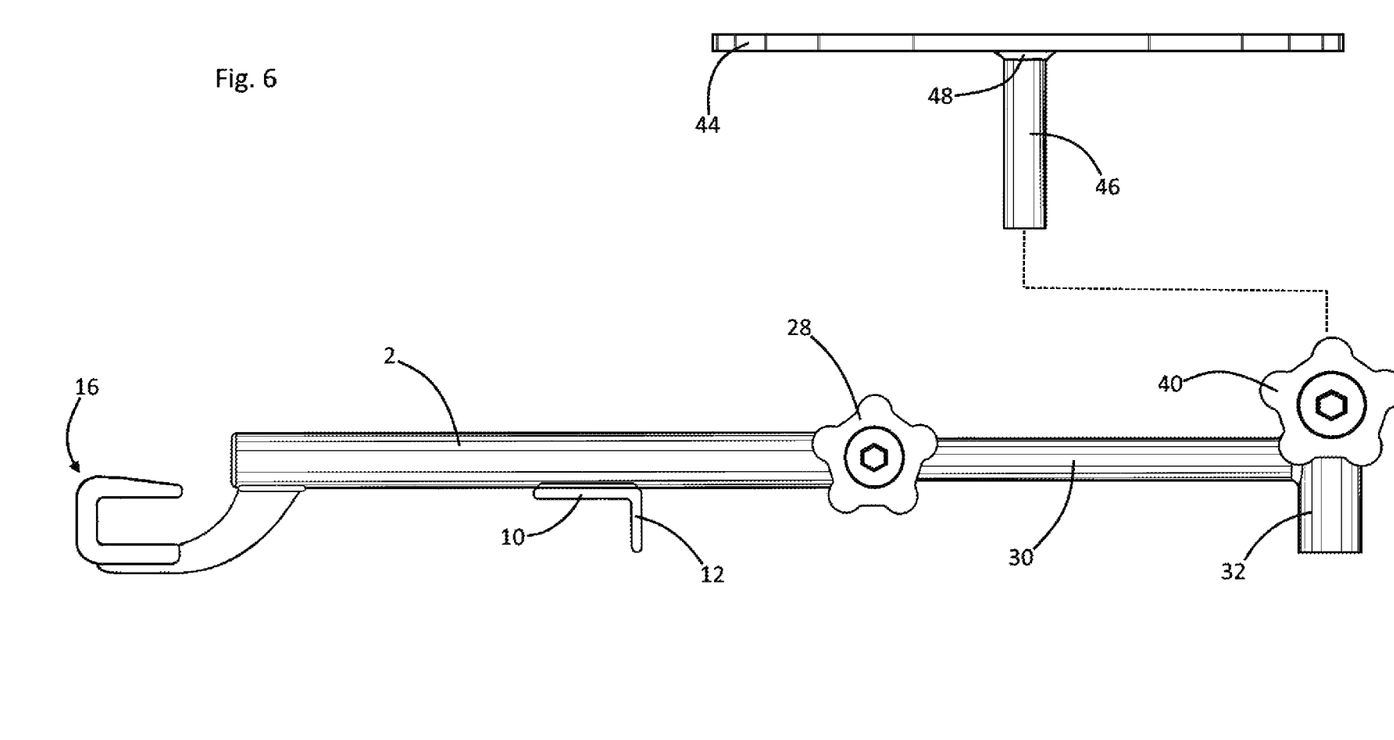
FIG. 6 redepicts the assembly of FIG. 1, the view of FIG. 6 showing satellite dish removed, and showing a dish support plate in exploded view.
Figure 7:
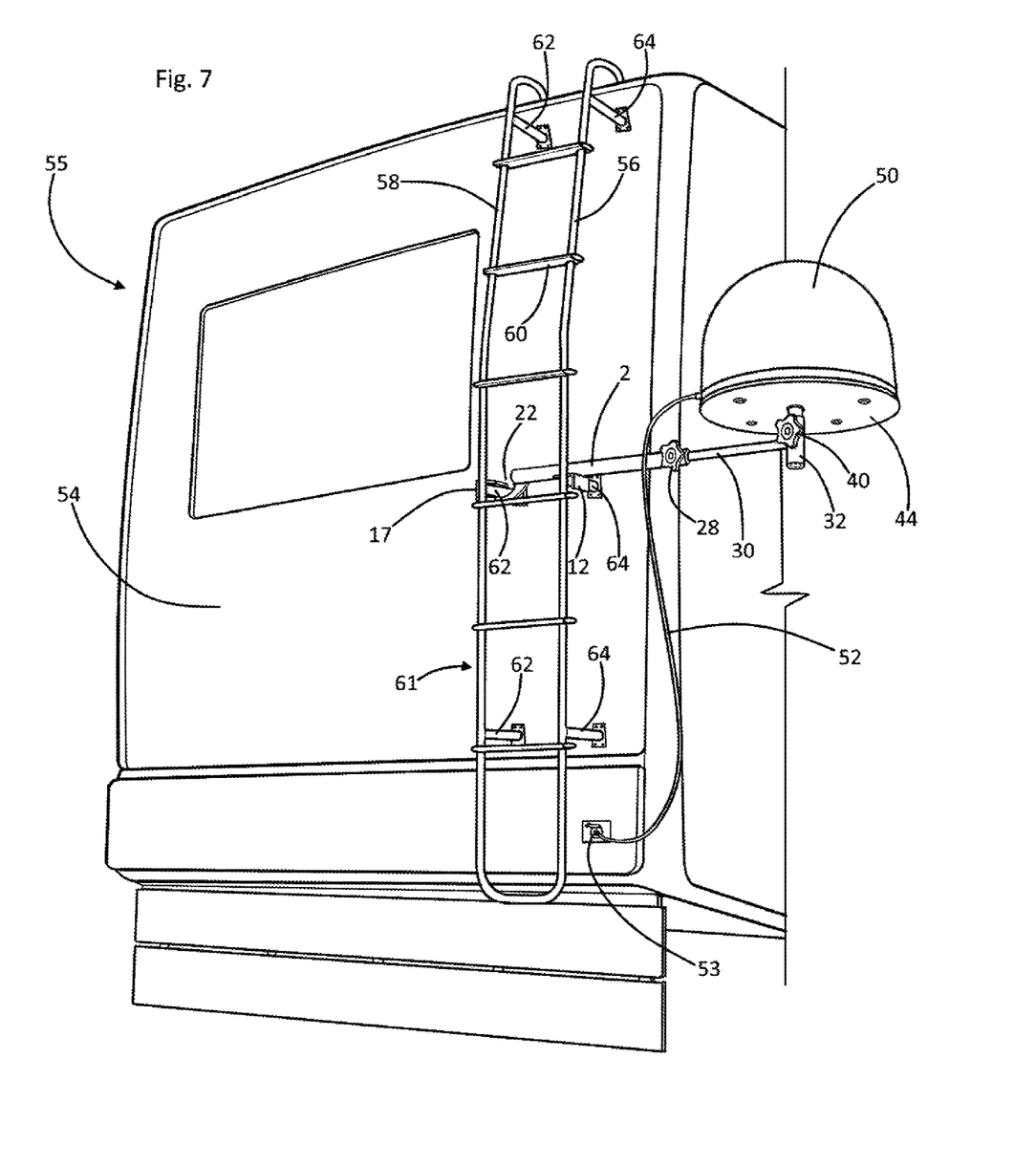
FIG. 7 presents the structure of FIG. 1 in perspective view, the view of FIG. 7 showing installation of the dish support upon a recreational vehicle ladder.
Figure 8:
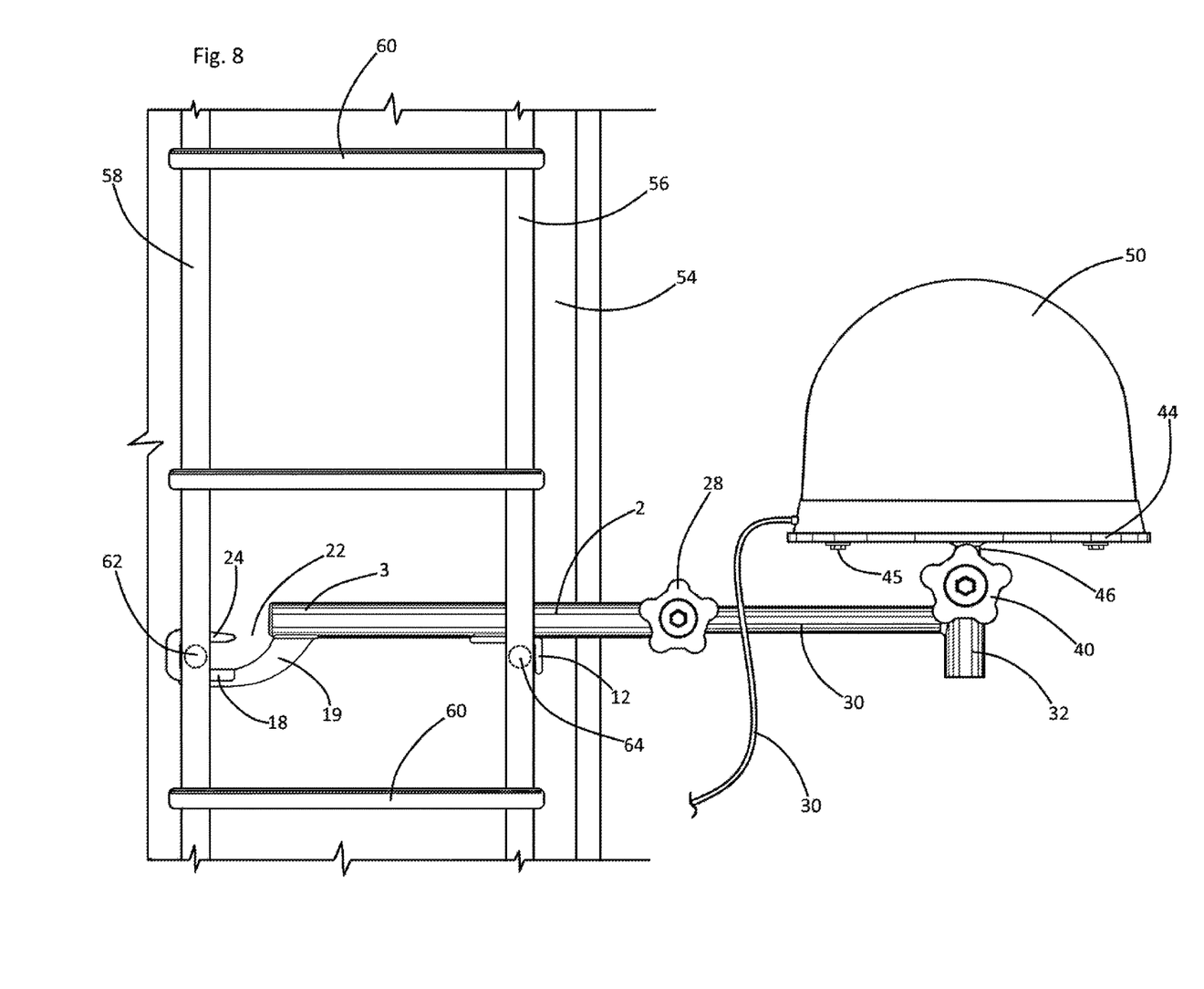
FIG. 8 is a partial rear view of the structure of FIG. 7.

In use of the instant inventive satellite dish support, referring simultaneously to FIGS. 7 and 8, an operator may initially bolt the dome covered satellite dish 50 to the upper surface of support plate 44 by means of mounting bolts 45. Thereafter, set screw 40 may be solidly turned clockwise for securely attaching the second arm's upper segment 46 along with plate 44 and attached satellite dish 50 to the lower segment 32. Similar turning of set screw 28 securely positions the distal segment 30 at a desired length of cantilevering arm extension. The satellite dish 50 has a cable lead 52 which is extendable to an external terminal 53 at the rear 54 of a recreational vehicle 55.

Following such assembly, the operator may proximally extend the proximal end 3 of the arm 2,30 including the attached "C" bracket assembly 16 along the rear wall 54 of the recreational vehicle 55, such extension causing such proximal end structures to travel in front of a ladder 61 of the type which is commonly attached to the rear of the vehicle 55. Laterally paired proximal and distal support posts 62 and 64 support the ladder 61 by attaching to the ladder's rails 58 and 56 at the rear of the vehicle 55. Upon such arm extension, the operator preferably positions the upwardly facing pivot stopping surface 20 of the "C" bracket 16 so that it immediately underlies one of the ladder's proximal or left side support posts 62. Substantially simultaneously, the operator may lower the arm's fulcrum point or surface 11 so that it contacts and immediately overlies an upper surface of the ladder's distally adjacent or right side ladder support post 64. As indicated in dashed lines drawn upon FIG. 3, rubber cushioning pads 13 and 15 may be applied to surfaces of the "C" bracket 16, the stabilizer plate 10, and a slide stopping flange 12 extending from such plate, such pads preventing marring or gouging of the support posts 62 and 64.

Thereafter, the operator may release his or her grasp upon the first arm 2,30 allowing the weight of the satellite dish 50 to deflect and downwardly lever the distal end of the arm so that the fulcrum point 11 bears against the upper surface of post 64. Simultaneously, such levering action about the fulcrum point 11 and about post 64 drives and counter-levers the upwardly facing pivot stop 20 against the lower surface of the adjacent proximal pivot stop 62. The simultaneous contacts of the pivot stop 20 with post 62, and of the fulcrum point 11 with post 64 advantageously hold the first arm 2,30 in the depicted lateral extension for cantilevering support of the satellite dish 50 at the side of the recreational vehicle 55. During such cantilevering support, the suitably provided longitudinal oblongation of stabilizer plate 10 along the length of post 64 advantageously prevents any longitudinal or front to rear rotating deflection of the satellite dish 50, such plate 10 advantageously holding the satellite dish in the depicted upright orientation.

During satellite dish supporting use of the instant inventive assembly, a user of the vehicle 55 may wish to climb or descend the ladder 61 by stepping successively upon ladder steps 60. In order to protect against an accident wherein the operator's foot mistakenly downwardly contacts and downwardly presses against the proximal end 3 of proximal segment 2, a downwardly facing pivot stop is preferably provided, such stop suitably constituting a lower surface 26 of an upper arm 24 of a "C" bracket 16. Such downwardly facing pivot stopping surface 26 preferably vertically overlies the upwardly facing pivot stopping surface 20 of the lower arm 18 of such "C" bracket 16. Surfaces 20 and 26 are preferably vertically displaced a distance sufficient for secure receipt of the proximal ladder support post 62, such surfaces bounding and defining a post capturing or retention space 23.

In operation, the downward pivot stop 26 advantageously opposes any downward deflection of the proximal end 3 of the proximal segment 2 upon such mistaken foot contact against segment 2. The stop 26 advantageously requires that the proximal end of the support's first arm temporarily positively function as a foot supporting surface rather than negatively and hazardously allowing such end to downwardly deflect.

During installed utilization of the instant inventive satellite dish support, it is desirable that the ladder's proximal support post 62 remain securely captured and contained within the interior space 23 of the "C" bracket 16, rather than experiencing an undesirable or mistaken exit of the post 62 from space 23 through post access space or port 22, such port 22 being defined and laterally bounded by the extreme distal end of the downwardly facing pivot stop 26 (or at the extreme distal end 27 of upper "C" bracket arm 24), and the extreme proximal of the proximal segment 2. To prevent such exit of post 62 via passage port 22, a downwardly extending slide stop or flange 12 may be fixedly attached to or wholly formed at the distal end or edge of the stabilizer plate 10. In a suitable embodiment, the lateral distance between slide stop 12 and the "C" channel's web 17 may be calibrated to closely match a standarized lateral displacement or left to right spacing between support posts 62 and 64 of common recreational vehicle rear ladders. Suitably (as indicated in FIG. 11), the "C" bracket 16 may alternatively open in the proximal direction, and upon such alternate configuration, the stop 12 may be correspondingly positioned for engagement with a proximal side of post 64.

Figure 10:
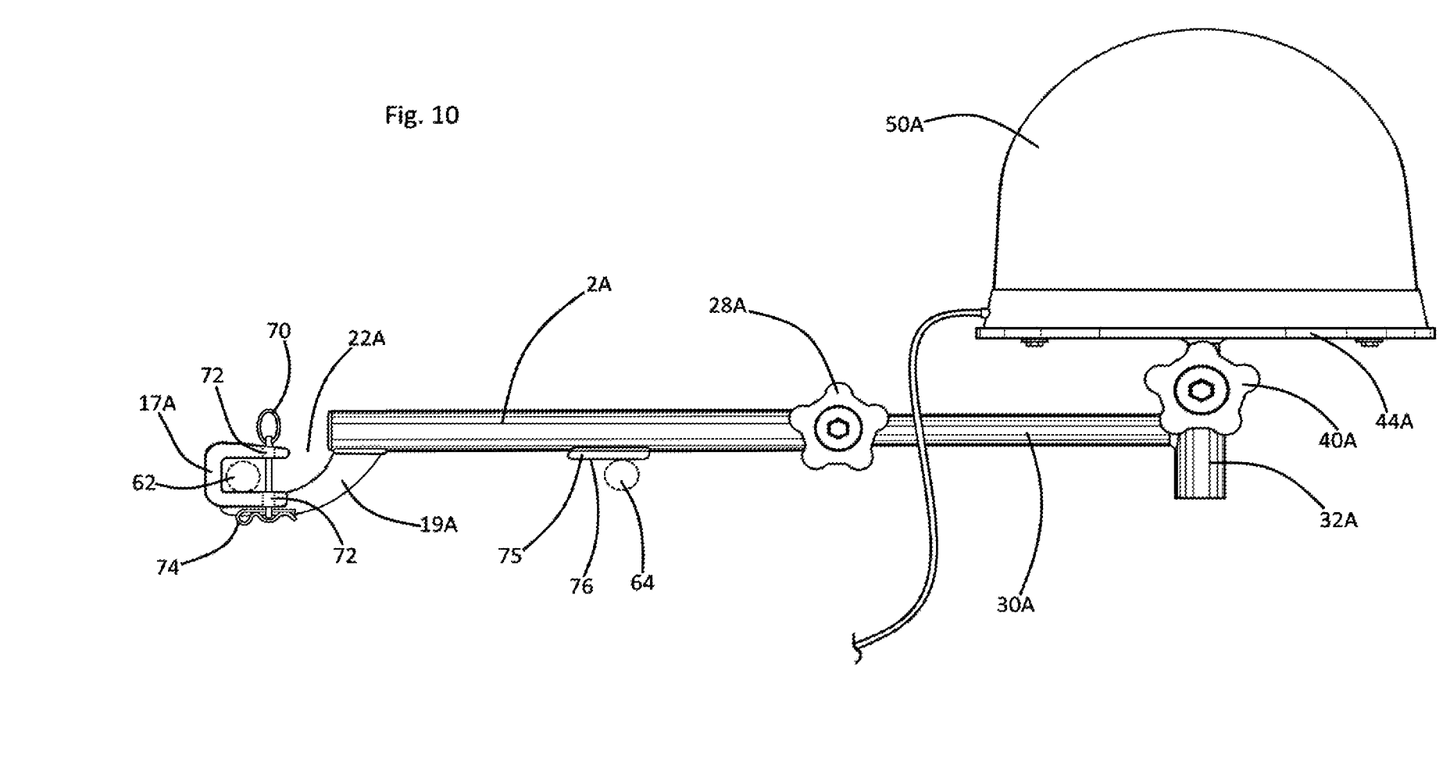
FIG. 10 presents an alternative configuration of the structure of FIG. 1.

Referring simultaneously to FIGS. 1-6 and 10, all structures of FIG. 10 which are identified by a Reference Numeral having the suffix "A" are configured substantially identically with similarly numbered structures appearing in FIGS. 1-6. In the FIG. 10 structural alternative, a longitudinally oblongated stabilizer plate 75 includes a lower fulcrum contact surface 76, but omits any slide stopping flange. To replace the function of such flange, the FIG. 10 structural alternative provides a sheer pin 70 which extends vertically through the "C" bracket's vertically paired arms within vertically aligned eyes 72 (designated by dashed lines). In the FIG. 10 alternative, the lateral displacement or spacing between ladder posts 62 and 64 may vary as much as the lateral or left to right dimension of stabilizer plate 75, and pin 70 may advantageously capture the proximal post 62 within the "C" bracket regardless of the lateral position of the adjacent and distally positioned post 64. A pin eye engaging clip 74 may be provided for securely holding the slide stopping pin 70 in place.

Figure 11:
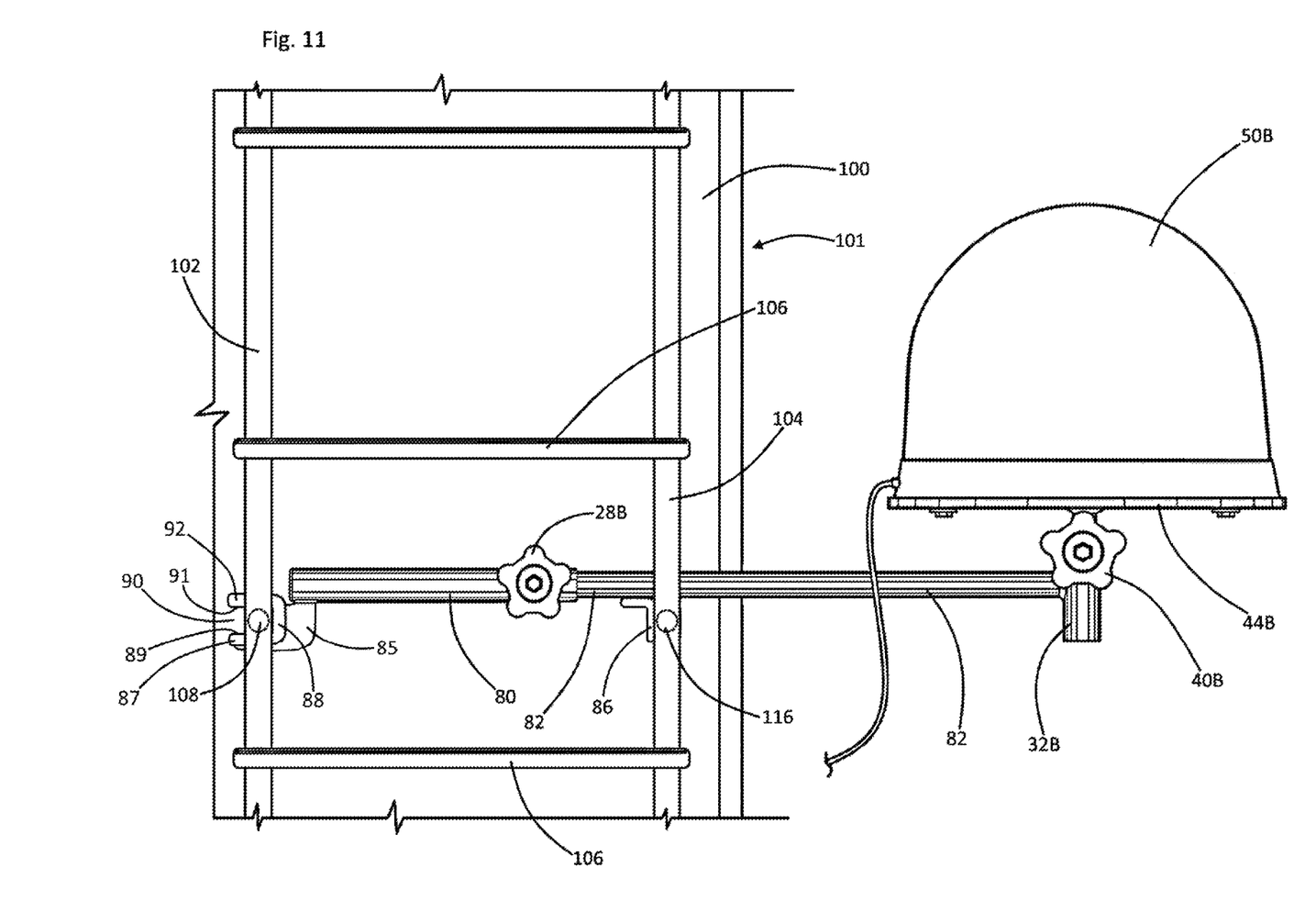
FIG. 11 presents a further alternative to the structural configuration of FIGS. 1 and 7.

In the further structural alterative of FIG. 11, all structures identified by a Reference Numeral having the suffix "B" are configured substantially identically with similarly numbered structures appearing in FIGS. 1-6. In the FIG. 11 alternative, a longitudinally oblongated stabilizer plate component may comprise a longitudinal oblongation of an upper surface 89 of a lower arm 87 of a proximally opening "C" bracket 88, such "C" bracket 88 being mounted to arm 80,82 by an extension bracket 85. The upper surface 89 of arm 87 further functions as the arm's upwardly facing pivot stopping component. The upper arm 92 of the "C" bracket 88 has a lower surface 91. Such alternative arm's first set screw 28B at the distal end of segment 80 may be tightened upon slidable lateral spacing of the web of "C" bracket 85 with respect to stop flange 86 to match a wider or different lateral displacement of ladder posts 108 and 116. In the FIG. 11 structural alternative, the upper surface 89 of the lower arm 87 of "C" bracket 85 downwardly bounds post capture space 90 while serving as the arm's first pivot stop.

Comparing the structures of FIGS. 8 and 11, the ladder 101 (with differently spaced rails 102 and 104, and steps 106) attached to the rear of recreational vehicle 100 may be recognized as being wider than the ladder 61 of FIGS. 1-6. The alternative attachment of the slide stop 86 to the arm's distal segment 82 may advantageously allow the telescoping quill and stem aspect of the first arm to accommodate greater variability of ladder widths.

Figure 9:
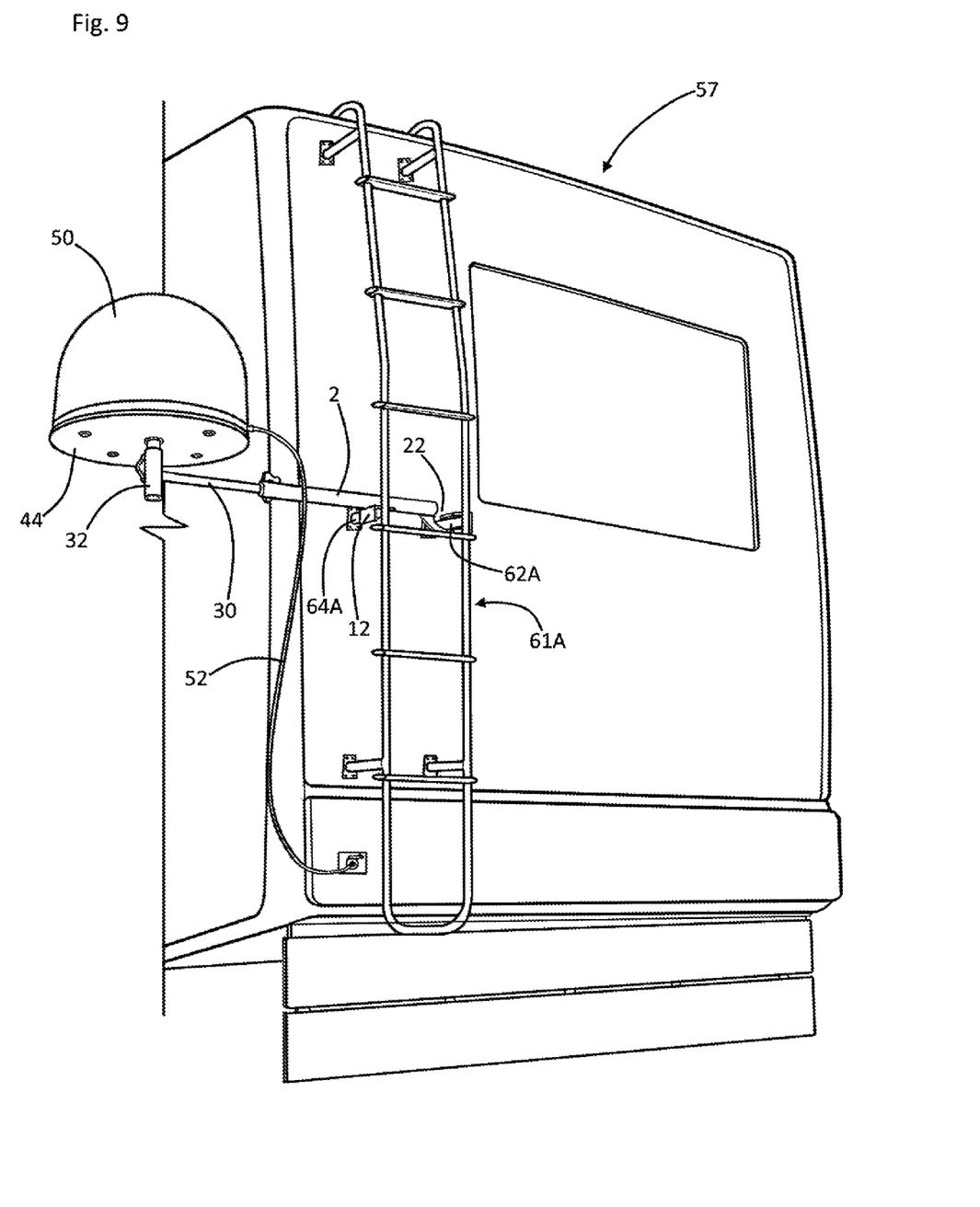
FIG. 9 presents a mirroring alternative configuration of the structure of FIG. 8.

A simultaneous viewing of FIGS. 8 and 9 indicates that the instant inventive recreational vehicle satellite dish support may "ambidextrously" attach to ladders 61 and 61A which may be respectively or alternatively attached to the right and left sides of the rearward ends 54 and 54A of various recreational vehicles 55 and 57.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A recreational vehicle satellite dish support comprising (a) a first arm having a proximal end, a distal end, a front side, a rear side, and a lower side; (b) a fulcrum beneath the first arm, the fulcrum being positioned between the first arm's proximal and distal ends; (c) an upwardly facing pivot stop fixedly positioned at the first arm's proximal end; (d) a satellite dish mount fixedly attached to the first arm's distal end; and (e) a stabilizer plate fixedly attached to the first arm, wherein the stabilizer plate extends frontwardly from the first arm, wherein the stabilizer plate further extends rearwardly from the first arm, wherein the stabilizer plate has a lower side, and wherein the fulcrum is further positioned at the stabilizer plate's lower side.

2. The recreational vehicle satellite dish support of claim 1 wherein the first arm comprises a proximal segment and a distal segment, and wherein said segments are telescopically interconnected.

3. The recreational vehicle satellite dish support of claim 2 further comprising a downwardly facing pivot stop fixedly positioned at the first arm's proximal end, the downwardly facing pivot stop being further positioned upwardly from the upwardly facing pivot stop.

4. The recreational vehicle satellite dish support of claim 3 further comprising a post capture space, said space being vertically bounded by the downwardly and upwardly facing pivot stops.

5. The recreational vehicle satellite dish support of claim 4 further comprising a post passage port.

6. The recreational vehicle satellite dish support of claim 5 further comprising a slide stop fixedly attached to and extending downwardly from the first arm's distal segment.

7. The recreational vehicle satellite dish support of claim 6 wherein the slide stop is adapted for, upon a receipt of a first ladder post within the post capture space, and upon contact by the fulcrum with another ladder post, resisting distal movement of the first arm.

8. The recreational vehicle satellite dish support of claim 2 further comprising a first set screw connected operatively at a distal end of the first arm's proximal segment, the first set screw being adapted for alternatively permitting and resisting telescoping of the first arm's distal segment.

9. The recreational vehicle satellite dish support of claim 2 further comprising a second arm having upper and lower ends, wherein the satellite dish mount comprises the second arm.

10. The recreational vehicle satellite dish support of claim 9 wherein the second arm comprises a lower segment and an upper segment, and wherein said segments are telescopically interconnected.

11. The recreational vehicle satellite dish support of claim 9 further comprising a plate fixedly attached to the second arm's upper end.

12. The recreational vehicle satellite dish support of claim 10 further comprising a set screw connected operatively to the second arm's lower segment, the set screw being adapted for alternatively permitting and resisting telescoping motions of the second arm's upper segment.

13. The recreational vehicle satellite dish support of claim 4 further comprising a slide stop spanning between the downwardly and upwardly facing pivot stops.

14. The recreational vehicle satellite dish support of claim 13 wherein the slide stop comprises a sheer pin and aligned eyes combination.

* * * * *